Figure 1:
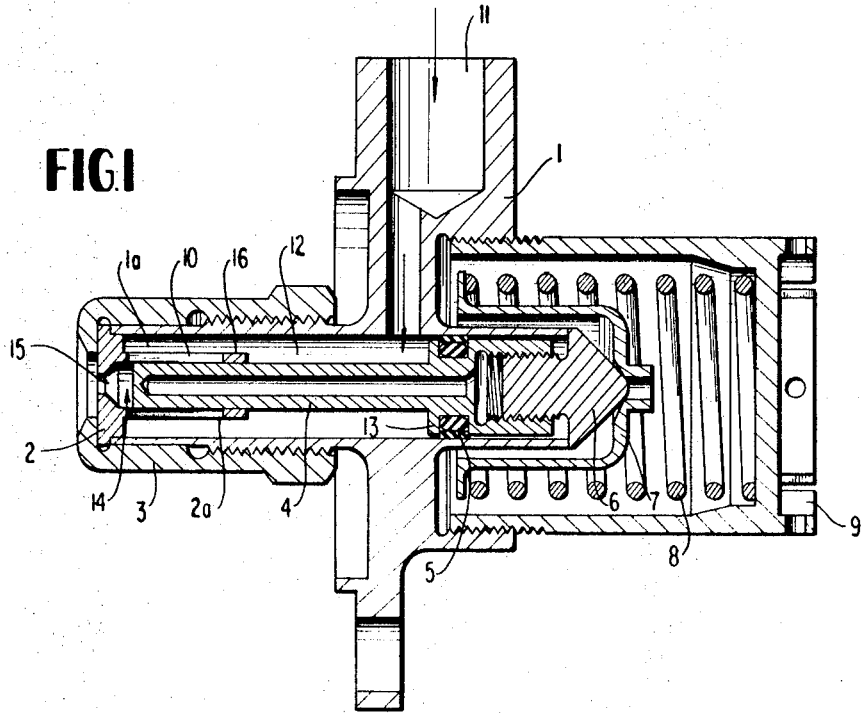

United States Patent

[11] 3,581,999

[72] Inventor Adolf Fehler
 Puchheim, Germany
[21] Appl. No. 808,405
[22] Filed Mar. 19, 1969
[45] Patented June 1, 1971
[73] Assignee M.A.N. Turbo G.m.b.H.
 Munich, Allach, Germany
[32] Priority Mar. 29, 1968
[33] Austria
[31] A3101/68

[54] FUEL CONTROL NOZZLE, PARTICULARLY FOR GAS TURBINE COMBUSTION CHAMBERS
 5 Claims, 2 Drawing Figs.
[52] U.S. Cl. .................................... 239/483,
 239/533
[51] Int. Cl. .................................... B05b 1/34

[50] Field of Search .......................... 239/483,
 482, 473, 533; 137/625.3, 509

[56] References Cited
 UNITED STATES PATENTS
1,285,769 11/1918 Melcher ................... 137/625.3
2,387,690 10/1945 Stelzel ..................... 239/533
2,864,649 12/1958 Adams ..................... 239/533X
 FOREIGN PATENTS
948,741 1/1949 France ..................... 239/483

Primary Examiner—Lloyd L. King
Assistant Examiner—Thomas C. Culp, Jr.
Attorney—Craig, Antonelli, Stewart & Hill ABSTRACT: A fuel control nozzle, particularly for gas turbine combustion chambers in which the control piston is provided with fuel-metering slots of closed profile and the atomizer head has a closed circumference at its rear end.

PATENTED JUN 1 1971

3,581,999

INVENTOR
ADOLF FEHLER

BY Craig, Antonelli, Stewart & Hill

ATTORNEYS

FUEL CONTROL NOZZLE, PARTICULARLY FOR GAS TURBINE COMBUSTION CHAMBERS

The present invention relates to a fuel control nozzle, particularly for gas turbine combustion chambers, with a stepped control piston or valve spool, axially displaceable in the nozzle body and subjected to fuel pressure acting against the force of a spring, the smaller end face of the control piston or valve spool controlling the flow cross section of fuel-metering slots arranged tangentially in an associated cylindrical atomizer head.

With known fuel control nozzles of this type, the dual fitting of the stepped control piston, which is difficult to control from a manufacturing point of view is the cause of persistent sealing troubles and thus fuel leakages. In addition, the tangential fuel-metering slots are cut or milled-in from the rear end face of the atomizer head, which causes the slotted cylindrical section of the atomizer head to flare, constituting a condition which cannot ensure proper sealing of the piston or the spool. Due to the small dimensions of the workpiece, only metering slots of rectangular shape or profile have been made heretofore. For this reason, it had not been possible to achieve minimum flow areas and thus to valve minimum fuel quantities, a fact which restricts the permissive operating range of the fuel control nozzle.

This invention is intended to eliminate all the aforementioned disadvantages of known devices and aims at creating a fuel control nozzle which permits an accurate metering of even the smallest fuel quantities.

As solution to the underlying problems, the present invention proposes fuel-metering slots with closed profiles (i.e., not open-ended slots as used previously) and an atomizer head featuring a closed circumference at its rear end face. The closed circumference on the rear end face of the atomizer head will prevent expanding or flaring of the bore, so that the control piston or valve spool can be fitted into the atomizer head with minimum clearance, thus preventing the occurrence of uncontrollable fuel leakage whereby an exact fuel metering is made possible. Only by eliminating such uncontrollable fuel leakages will it be possible to manufacture several fuel nozzles with identical characteristics. The closed profiles of the fuel-metering slots are spark-eroded. This manufacturing technique is suited for cutting metering slot profiles which, according to another feature of the present invention, have the shape of slender, approximately isosceles triangles, the tips of which are located at the burner end of the cylindrical section of the atomizer head.

The use of such profiles for fuel metering slots is advantageous in that even smallest fuel quantities can be accurately metered and satisfactorily atomized.

According to another feature of this invention, the support of the control piston or valve spool in the body along its larger diameter by means of a resilient ring (e.g. a Glyd ring) serves also for the prevention of fuel leakages and thus for the accurate metering by the fuel control nozzle. This form of sealing is advantageous for compensating particularly well any manufacturing inaccuracies and also for damping vibrations, so that, in this area, no leakage fuel can enter the spring space, and any possibly developing vibrations of the spool will die away fast.

Finally, another feature of the present invention proposes an adjusting screw to be provided on the control piston or valve spool for the accurate setting of the quantity of zero flow delivery, this adjusting screw opening a feed area or supply cross section of any desired size when the spool is in its neutral or normal rest position. Compared with known devices, in which the zero flow delivery is also controlled by the fuel pressure, this arrangement offers the advantage that, at already low injection pressures, very small fuel quantities can be atomized prior to any response of the control mechanism. Another advantage resides in the possibility of determining an identical starting point for the characteristic of several identical fuel control nozzles.

Accordingly, it is an object of the present invention to provide a fuel control nozzle, particularly for gas turbine combustion chambers which avoids by simple means the aforementioned shortcomings and drawbacks.

Another object of the present invention resides in a fuel control nozzle which effectively prevents leakages of fuel, yet permits accurate metering of the fuel even in minute quantities.

A further object of the present invention resides in a fuel control nozzle, especially for gas turbine combustion engine chambers which can be readily manufactured in a simple manner with prohibitive expenditures.

Another object of the present invention resides in a fuel control nozzle of the type described above which reduces restrictions placed on the permissive operating range of the fuel control nozzle.

Still a further object of the present invention resides in a fuel control nozzle that permits accurate manufacture and duplication of several nozzles with identical characteristics.

Still another object of the present invention resides in a fuel control nozzle of the type described above which accurately meters even the smallest quantities of fuel and permits the effective atomization thereof.

Figure 2:
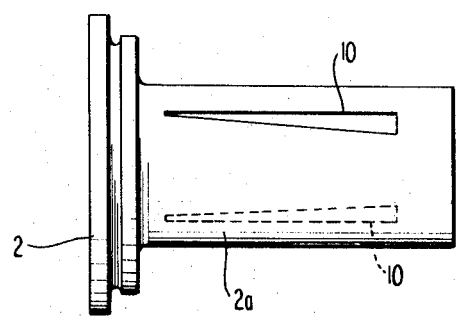

These and further objects, features and advantages of the present invention will become more obvious from the following description when taken in connection with the accompanying drawing, which shows, for purposes of illustration only, one embodiment in accordance with the present invention, and wherein:

FIG. 1 is a center longitudinal cross-sectional view through a complete fuel control nozzle according to the present invention; and FIG. 2 is an elevational view, on an enlarged scale, of the atomizer head with fuel-metering slots of FIG. 1.

Referring now to the drawing wherein like reference numerals are used in the two views to designate like parts, reference numeral 1 designates a body or housing of the fuel control nozzle provided with a central bore 1a, into which an atomizer head 2 is inserted and secured by a threaded cover cap 3. The cylindrical section 2a of atomizer head 2 receives the smaller diameter of a control piston or valve spool 4, which, with its end having the largest diameter is supported in central bore 1a by means of a resilient ring 5. An adjusting screw 6 screwed into the control piston or valve spool 4 simultaneously serves for setting the zero flow delivery of the fuel control nozzle and for the mounting of an inner spring retainer 7 holding a compression spring 8, which is retained at its other end in the body 1 by means of outer spring retainer 9.

Triangular fuel-metering slots 10 are arranged in the cylindrical section 2a of the atomizer head 2, shown on an enlarged scale in FIG. 2.

During operation, fuel flows through the body inlet bore 11 into the supply chamber 12 and applies pressure to the unrestricted annular surface 13 of the control piston or valve spool 4. Simultaneously, fuel flows through the predetermined free cross-sectional area 14 of metering slots 10 into a vortex chamber 15 arranged in the forward zone of atomizer head 2. When the pressure rises, the control piston or valve spool 4 is moved against compression spring 8 and thereby coordinates to the respective fuel quantity a predetermined free cross section 14 of the metering slots 10.

Due to the closed circumference on rear end face 16 of the atomizer head 2 and the tight fit achieved thereby, there will be no fuel leakage in this area.

While I have shown and described only one embodiment in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are within the scope of those skilled in the art.

I claim:

1. A fuel control nozzle, particularly for gas turbine combustion chambers, with a stepped control piston axially displaceable in a nozzle body and subjected to fuel pressure acting against the force of a spring, with the smaller end face of said control piston controlling the flow cross section of fuel-metering slot means provided in an associated substantially cylindrical atomizer head, the fuel-metering slot means having the shape of slender, approximately isosceles triangles, the tips of which are located at the burner end of the cylindrical section of the atomizer head, wherein said fuel-metering slot means are arranged substantially tangentially in the atomizer head.

2. A fuel control nozzle according to claim 1, characterized in that the control piston is supported with its end having the largest diameter in the body by way of resilient means.

3. A fuel control nozzle according to claim 2, characterized in that zero flow delivery is adjusted on the control piston by means of an adjusting screw.

4. A fuel control nozzle according to claim 2, wherein said resilient means is a resilient ring.

5. A fuel control nozzle according to claim 1, characterized in that zero flow delivery is adjusted on the control piston by means of an adjusting screw.